(12) United States Patent
Baar et al.

(10) Patent No.: US 11,394,955 B2
(45) Date of Patent: Jul. 19, 2022

(54) OPTICS DEVICE FOR TESTING CAMERAS USEFUL ON VEHICLES

(71) Applicant: Aptiv Technologies Limited, St. Michael (BB)

(72) Inventors: James C. Baar, Logansport, IN (US); Ronald M. Taylor, Greentown, IN (US); Timothy D. Garner, Cicero, IN (US); Nathan R. Faulks, Westfield, IN (US); Michael D. Cervoni, Royal Oak, MI (US); Piotr Szewc, Cracow (PL); Gerald Stier, Sterling Heights, MI (US); Yew Kwang Low, Singapore (SG)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 16/746,329

(22) Filed: Jan. 17, 2020

(65) Prior Publication Data
US 2021/0227204 A1 Jul. 22, 2021

(51) Int. Cl.
| H04N 17/02 | (2006.01) |
| H04N 5/225 | (2006.01) |
| H04N 17/00 | (2006.01) |
| H04N 5/235 | (2006.01) |

(52) U.S. Cl.
CPC ......... H04N 17/002 (2013.01); H04N 5/2253 (2013.01); H04N 5/2256 (2013.01); H04N 5/2354 (2013.01)

(58) Field of Classification Search
CPC .. H04N 17/002; H04N 5/2253; H04N 5/2256; H04N 5/2354
See application file for complete search history.

(56) References Cited

U.S. PATENT DOCUMENTS

| 4,732,470 A * | 3/1988 | Priddy | F41G 3/326 |
| | | | 356/124 |
| 8,300,103 B2 * | 10/2012 | He | G03B 43/00 |
| | | | 348/187 |
| 8,686,943 B1 * | 4/2014 | Rafii | G06K 9/4671 |
| | | | 345/158 |
| 8,896,695 B2 * | 11/2014 | Peters, III | G01C 11/025 |
| | | | 348/144 |
| 9,366,838 B2 * | 6/2016 | Barnes | G02B 6/4469 |
| 9,521,319 B2 * | 12/2016 | Rodda | H04N 5/23232 |
| 9,798,054 B1 * | 10/2017 | Low | H04N 5/2254 |

(Continued)

FOREIGN PATENT DOCUMENTS

| CN | 106502039 A | 3/2017 |
| EP | 2924492 A1 | 9/2015 |

OTHER PUBLICATIONS

Extended European Search Report for Application No. EP 21 15 1761 dated Jun. 14, 2021.

*Primary Examiner* — Brian P Yenke
(74) *Attorney, Agent, or Firm* — Carlson, Gaskey & Olds, P.C.

(57) ABSTRACT

An illustrative example embodiment of a camera testing device includes a plurality of optic components in a predetermined arrangement that places a center of each of the optic components in a position to be aligned with a line of sight of a respective, predetermined portion of a camera field of view when the plurality of optic components are between the camera and at least one target.

9 Claims, 4 Drawing Sheets

(56) References Cited

U.S. PATENT DOCUMENTS

| | | | |
|---|---|---|---|
| 9,857,584 B2* | 1/2018 | Singh | G02B 7/02 |
| 9,863,866 B2* | 1/2018 | Bugher | G01N 17/002 |
| 9,888,194 B2* | 2/2018 | Duparre | B82Y 30/00 |
| 10,123,120 B2* | 11/2018 | Mentz | H04S 3/00 |
| 10,275,024 B1* | 4/2019 | Simmons | H04N 13/344 |
| 10,306,218 B2* | 5/2019 | Shroff | H04N 17/002 |
| 10,362,203 B2 | 7/2019 | Taylor et al. | |
| 10,419,672 B2* | 9/2019 | Laroia | G06T 7/20 |
| 10,542,196 B2* | 1/2020 | Brueckner | G06T 7/80 |
| 10,670,858 B2* | 6/2020 | Schmieder | G03B 17/17 |
| 10,704,984 B2* | 7/2020 | Kang | G02B 25/02 |
| 2008/0018885 A1* | 1/2008 | Inskeep | G01N 21/8806 356/237.1 |
| 2011/0069189 A1* | 3/2011 | Venkataraman | H01L 27/14625 348/218.1 |
| 2011/0122308 A1* | 5/2011 | Duparre | H04N 9/04 348/340 |
| 2011/0285857 A1 | 11/2011 | He | |
| 2012/0050024 A1* | 3/2012 | Taylor | B60R 1/00 340/435 |
| 2013/0068368 A1* | 3/2013 | Kim | G01R 31/2635 156/64 |
| 2013/0070107 A1* | 3/2013 | Tapes | G03B 13/30 348/187 |
| 2013/0193315 A1* | 8/2013 | Shemesh | G01J 1/04 250/226 |
| 2014/0152845 A1 | 6/2014 | Seger et al. | |
| 2014/0192214 A1* | 7/2014 | Laroia | G02B 13/16 348/218.1 |
| 2014/0204220 A1 | 7/2014 | Schmack et al. | |
| 2015/0109468 A1* | 4/2015 | Laroia | G02B 5/08 348/208.6 |
| 2015/0116547 A1* | 4/2015 | Laroia | H04N 5/23245 348/240.1 |
| 2015/0138372 A1 | 5/2015 | Apel et al. | |
| 2015/0145950 A1* | 5/2015 | Murphy | H04N 5/23238 348/36 |
| 2015/0185592 A1* | 7/2015 | Eineren | G02B 27/0006 348/375 |
| 2015/0241713 A1* | 8/2015 | Laroia | H04N 5/2328 348/208.2 |
| 2016/0112637 A1* | 4/2016 | Laroia | H04N 5/2254 348/221.1 |
| 2016/0142631 A1* | 5/2016 | Silva | H04N 5/247 348/38 |
| 2016/0280136 A1* | 9/2016 | Besson | B60R 1/00 |
| 2016/0381301 A1* | 12/2016 | Shroff | G06T 11/60 348/240.3 |
| 2017/0041528 A1* | 2/2017 | Lai | H04N 5/243 |
| 2017/0048517 A1 | 2/2017 | Aharon | |
| 2017/0111558 A1* | 4/2017 | Brueckner | G06T 7/80 |
| 2017/0129402 A1* | 5/2017 | Low | H04N 5/2252 |
| 2017/0132774 A1* | 5/2017 | Ruprecht | H04N 13/239 |
| 2017/0167967 A1 | 6/2017 | Bugher et al. | |
| 2017/0282795 A1* | 10/2017 | Low | H04N 5/2254 |
| 2017/0290170 A1* | 10/2017 | Low | H05K 1/028 |
| 2017/0307493 A1* | 10/2017 | Wang | G01N 3/12 |
| 2018/0035109 A1 | 2/2018 | Fiebig | |
| 2018/0106978 A1* | 4/2018 | Wang | G02B 7/021 |
| 2018/0213220 A1* | 7/2018 | Corley | H04N 5/2256 |
| 2018/0246290 A1* | 8/2018 | Wang | G02B 7/025 |
| 2019/0182415 A1* | 6/2019 | Sivan | G06F 3/013 |
| 2019/0248301 A1* | 8/2019 | Edgarian | H04N 5/2252 |
| 2019/0266752 A1 | 8/2019 | Dlugosz et al. | |
| 2020/0063913 A1* | 2/2020 | Gubler | F16M 11/18 |

* cited by examiner

OPTICS DEVICE FOR TESTING CAMERAS USEFUL ON VEHICLES

BACKGROUND

Modern automotive vehicles include an increasing amount of electronic technology, such as sensors, detectors and cameras that provide information regarding the environment near a vehicle to facilitate driver assistance or autonomous vehicle control. Before such devices are included on vehicles, they go through testing and validation procedures. Special arrangements typically have to be made to conduct such testing.

One drawback associated with existing testing procedures is that they require a relatively large testing area. For example, a testing area may be on the order of ten meters long by four meters wide, which takes up substantial space within a building or facility. Even those dimensions are not large enough to conduct some needed testing. For example, it may be necessary to test the ability of a camera to detect an object fifty meters away.

Another challenge is associated with the advances in camera technology. Cameras with wider fields of view and higher resolution are available. Those features introduce additional testing challenges. For example, the reduced size of the pixels amplifies the effects of any distortion that may be introduced by the testing equipment.

SUMMARY

An illustrative example embodiment of a camera testing device includes a plurality of optic components in a predetermined arrangement that places a center of each of the optic components in a position to be aligned with a line of sight of a respective, predetermined portion of a camera field of view when the plurality of optic components are between the camera and at least one target.

An example embodiment having one or more features of the camera testing device of the previous paragraph includes a frame that supports the plurality of optic components in the predetermined arrangement.

In an example embodiment having one or more features of the camera testing device of any of the previous paragraphs, the frame is formed by three-dimensional printing.

In an example embodiment having one or more features of the camera testing device of any of the previous paragraphs, the frame supports at least a first one of the optic components in a first orientation, at least a second one of the optic components in a second orientation that is different than the first orientation, and at least a third one of the optic components in a third orientation that is different than the second orientation.

An example embodiment having one or more features of the camera testing device of any of the previous paragraphs includes a plurality of targets and wherein the frame supports the targets in a target arrangement corresponding to the predetermined arrangement of the optic components.

In an example embodiment having one or more features of the camera testing device of any of the previous paragraphs, the targets include a source of light that is selectively controllable to emit a selected color or brightness of light for adjusting an appearance of at least a selected one of the targets.

An example embodiment having one or more features of the camera testing device of any of the previous paragraphs includes an actuator that supports the frame and the actuator is configured to move the frame into a plurality of positions.

In an example embodiment having one or more features of the camera testing device of any of the previous paragraphs, the frame is part of an environmental chamber, each of the optic components comprising a sealed housing including a lens, a window and a vacuum between the window and the lens, and the frame supports the optic components with the window of each optic component facing toward one side of the frame that is configured to face an interior of the environmental chamber.

In an example embodiment having one or more features of the camera testing device of any of the previous paragraphs, each of the optic components comprises a sealed housing including a lens, a window and a vacuum between the window and the lens.

In an example embodiment having one or more features of the camera testing device of any of the previous paragraphs, each of the optic components comprises an achromatic doublet lens.

In an example embodiment having one or more features of the camera testing device of any of the previous paragraphs, each of the optic components alters an appearance of a target in a manner that causes the target to appear farther from the optic component than an actual distance between the target and the optic component.

An illustrative example embodiment of a system includes the camera testing device of any of the previous paragraphs, an environmental chamber configured to establish at least one preselected environmental condition, a camera support situated within the environmental chamber, and at least one target that is detectable by at least one camera. The camera testing device is situated between the camera support and the at least one target.

In an example embodiment having one or more features of the system of any of the previous paragraphs, the camera testing device is situated inside the environmental chamber.

In an example embodiment having one or more features of the system of any of the previous paragraphs, the camera testing device comprises an actuator that is configured to move the plurality of optic components into a plurality of positions relative to the camera support and the camera testing device is situated outside the environmental chamber.

In an example embodiment having one or more features of the system of any of the previous paragraphs, the environmental chamber includes at least one panel between the camera support and the at least one target, the plurality of optic components are supported by the at least one panel, each of the optic components comprises a sealed housing including a lens, a window and a vacuum between the window and the lens, and the window of each optic component faces toward an interior of the environmental chamber.

An illustrative example method of testing a camera includes arranging a plurality of optic components in an arrangement that places a center of each of the optic components in a position to be aligned with a line of sight of a respective, predetermined portion of a camera field of view when the plurality of optic components are between the camera and at least one target; and acquiring at least one image of at least one target from the camera while the plurality of optic components are in the arrangement.

In an example embodiment having one or more features of the method of any of the previous paragraphs, a frame supports the plurality of optic components in the arrangement with at least one of the optic components in a first orientation, at least a second one of the optic components in a second orientation that is different than the first orientation, and at least a third one of the optic components in a third orientation that is different than the second orientation. The method comprises moving the frame into a plurality of positions and acquiring at least one image from the camera with the frame in each of the positions.

An example embodiment having one or more features of the method of any of the previous paragraphs includes supporting the optic components on at least one panel of an environmental chamber.

An example embodiment having one or more features of the method of any of the previous paragraphs includes situating the optic components within an environmental chamber.

An example embodiment having one or more features of the method of any of the previous paragraphs includes using the optic components to alter an appearance of a target in a manner that causes the target to appear farther from the optic component than an actual distance between the target and the optic component.

The various features and advantages of at least one disclosed example embodiment will become apparent to those skilled in the art from the following detailed description. The drawings that accompany the detailed description can be briefly described as follows.

DETAILED DESCRIPTION

Figure 1:
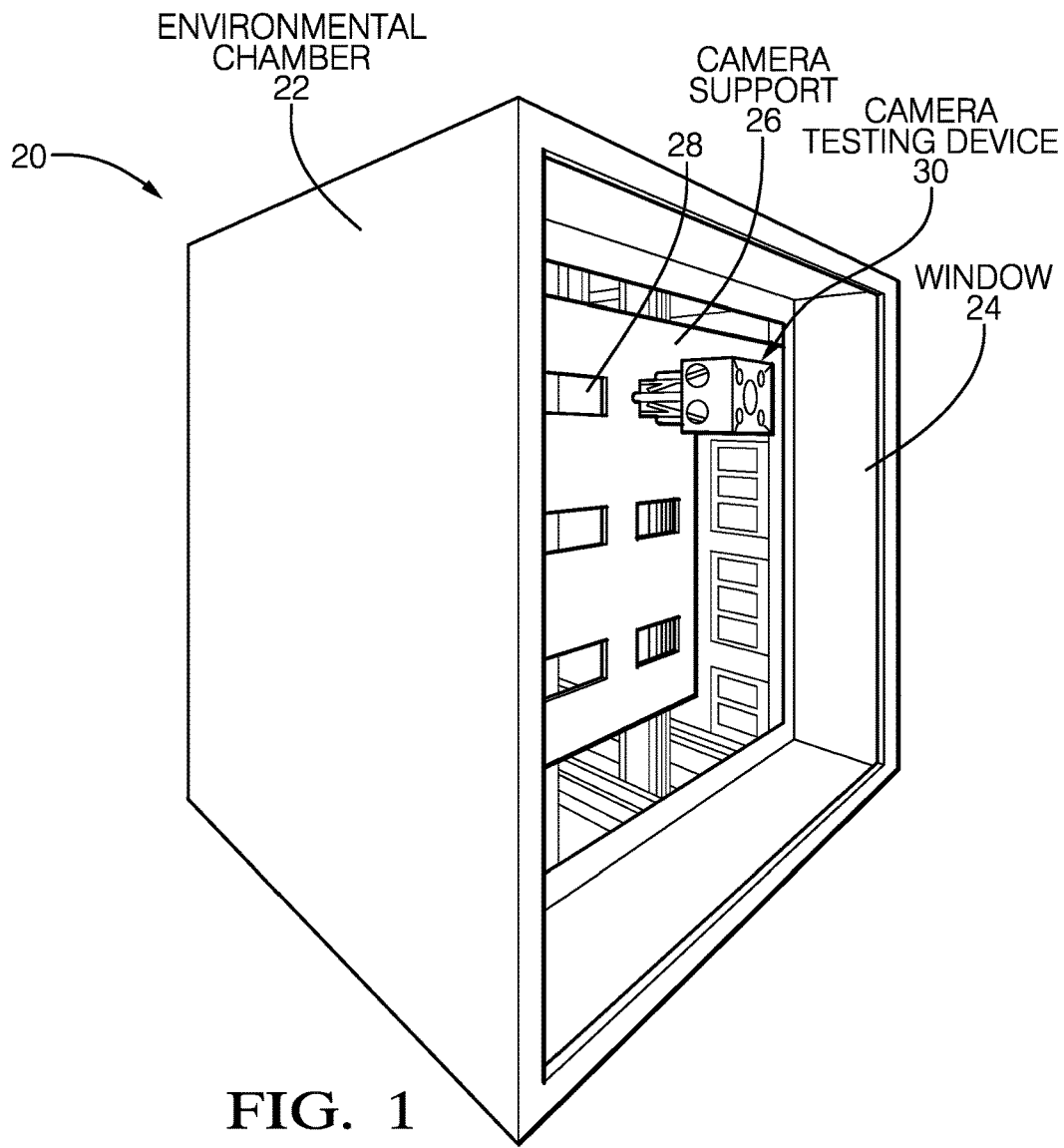
FIG. 1 diagrammatically illustrates selected portions of a camera testing system.

FIG. 1 diagrammatically illustrates selected portions of a camera testing system 20. An environmental chamber 22 is configured to establish at least one selected environmental condition, such as temperature or humidity, within the environmental chamber 22. One side of the environmental chamber 22 includes a window 24. A camera support 26 situated inside the environmental chamber 22 includes a plurality of mounting locations 28 that are each configured for mounting a camera testing device 30. In this example, the mounting locations 28 include slots that receive a portion of a camera testing device 30. While a single camera testing device 30 is shown for discussion purposes many situations will include multiple camera testing devices 30 mounted on the camera support 26.

Figure 2:
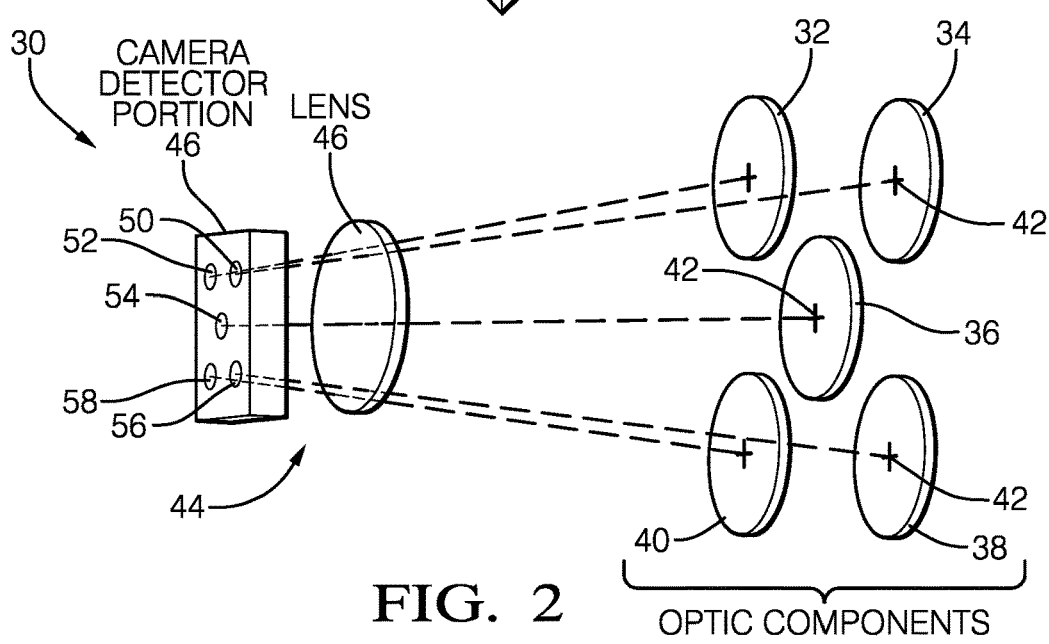
FIG. 2 schematically illustrates a camera testing device according to an example embodiment.

FIG. 2 schematically illustrates portions of an example camera testing device 30. The camera testing device 30 includes a plurality of optic components 32, 34, 36, 38 and 40. The optic components 32-40 are, for example, achromatic doublet lenses. While five optic components are shown in FIG. 2 for discussion purposes many embodiments will include more than five optic components.

The optic components 32-40 are in a preselected arrangement that places a center 42 of each of the optic components 32-40 in a line of sight of a portion of a field of view of a camera 44, which is only partially represented in FIG. 2. Each center 42 is aligned with a line of sight of a different, selected section of a detector portion 46 of the camera 44. The detector portion 46 includes the pixels that establish or define the resolution of the camera 44. Each of the selected sections includes at least one of the pixels of the detector portion 46 and in many embodiments the sections include a group or cluster of pixels (e.g., 250 pixels). FIG. 2 also shows a lens 48 of the camera 44, which is the only camera lens in this example.

In the illustrated arrangement of the optic components 32-40, the center 42 of the optic component 32 is aligned with the line of sight of a first section 50 of the detector portion 46, the center 42 of the optic component 34 is aligned with a second section 52, the center 42 of the optic component 36 is aligned with a third section 54, the center 42 of the optic component 38 is aligned with a fourth section 56 and the center 42 of the optic component 40 is aligned with a fifth section 58. The selected sections 50-58 are chosen to test particular sections of the detector portion 46, such as the center and near the edges of the field of view of the camera 44. At least one image acquired using the camera with the optic components 32-40 in the predetermined arrangement provides information regarding the selected sections 50-58 of the detector portion 46.

The optic components 32-40 are configured to make a target (not illustrated) appear further from the camera 44 than the actual or physical distance between the target and the camera 44. The optic components 32-40 are useful for testing the long range detection capabilities of the camera 44 without requiring target placement far away from the camera 44. The optic components 32-40 magnify the object space in the camera field of view. For example, a target may be placed within a meter of the camera 44 to test or measure the camera performance for a target distance of more than fifty meters.

The center 42 of each optic component 32-40 is coincident with or aligned with the line of sight of the respective sections 50-58 of the detector portion 46 to minimize or eliminate any distortion or other aberrations introduced by the optic components 32-40. With smaller pixels in higher resolution cameras, the curvature potentially introduced along the outermost portions of a lens, such as the optic components 32-40, degrades the modulation transfer function (MTF) or the contrast image quality of the camera 44. The strategic arrangement of the centers 42 of the optic components 32-40, which centers the optic component with the field of view line of sight, is configured to provide the highest focus quality and the highest possible MTF of the selected sections 50-58 of the detector portion 46.

Another feature of the arrangement of optic components in some embodiments is that respective targets for each of the selected sections of the detector portion 46 may be situated in a single plane. This simplifies the testing equipment compared to requiring a structure that supports targets in multiple planes.

Figure 3:
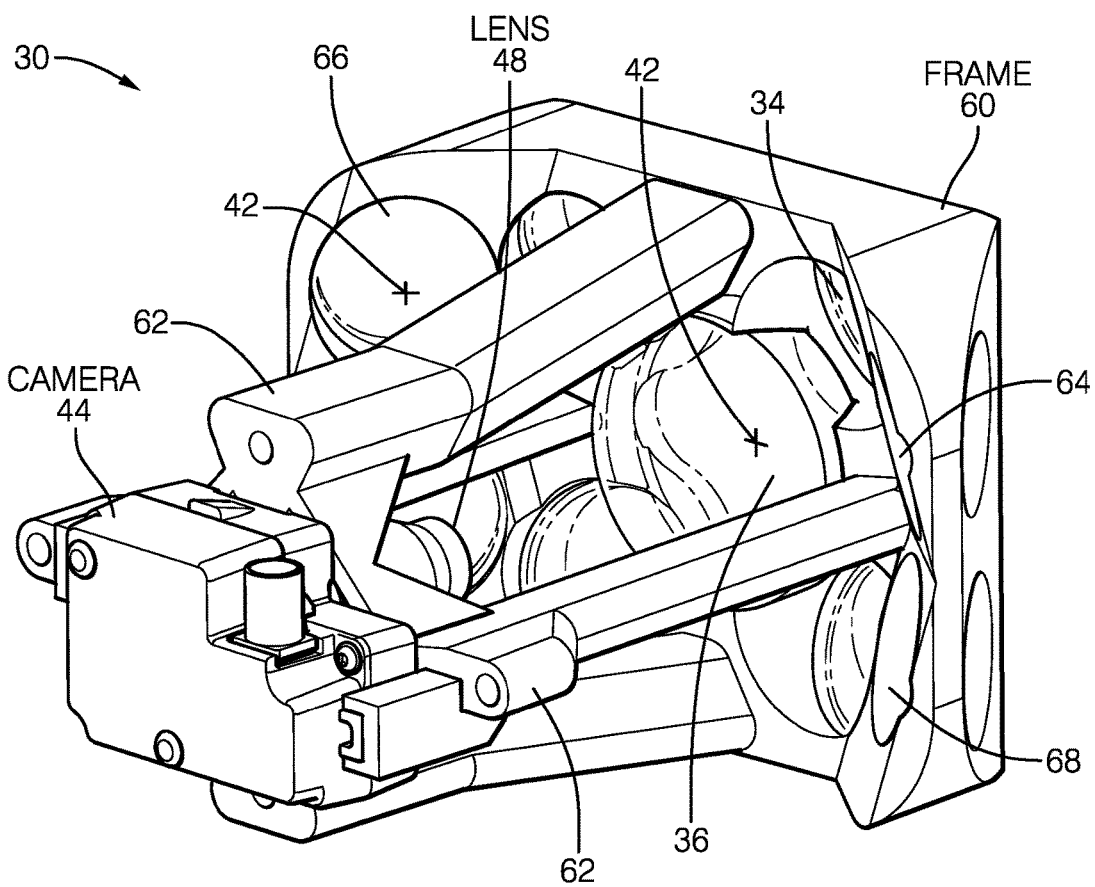
FIG. 3 is a diagrammatic, perspective illustration of an example camera testing device embodiment.
Figures 4, 5:
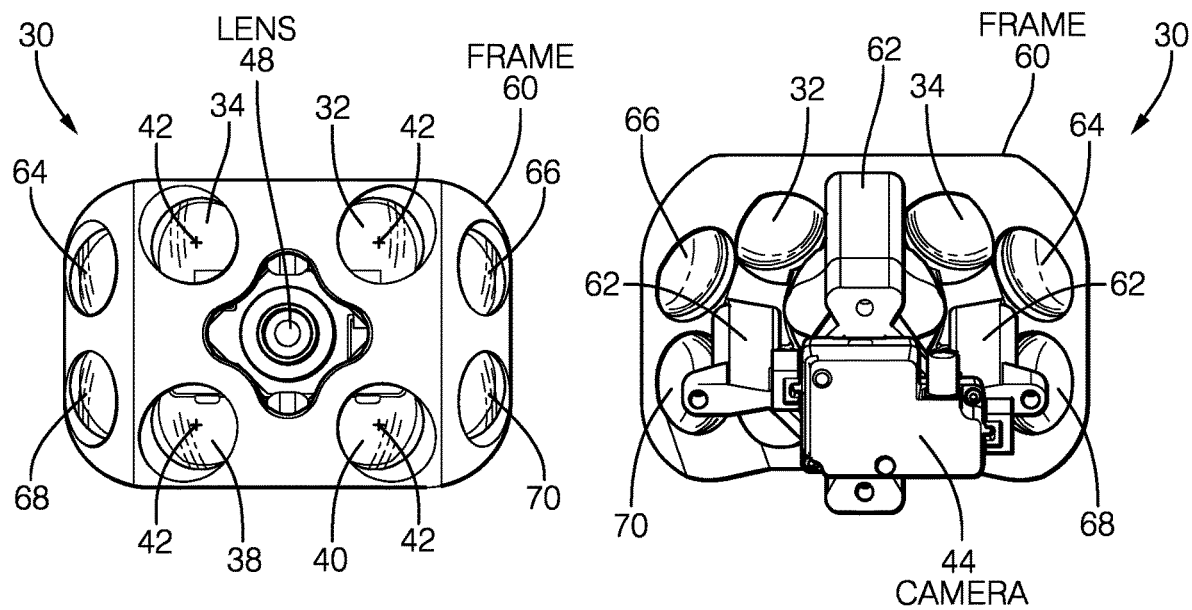
FIG. 4 shows the embodiment of FIG. 3 from one side.
FIG. 5 shows the embodiment of FIG. 3 from an opposite side than that shown in FIG. 4.

FIGS. 3-5 illustrate an example embodiment of a camera testing device 30 that includes nine optic components. This embodiment includes a frame 60 that supports the optic components in the selected arrangement. A plurality of arms 62 support the frame 60 relative to a housing of the camera 44 to achieve the desired alignment between the centers 42 of the optic components and the selected sections of the detector portion 46 (FIG. 2) of the camera 44.

As can be appreciated from FIGS. 3-5, the nine optic components include the optic components 32-40 as shown in FIG. 2 and an additional four optic components 64, 66, 68 and 70. The arrangement of the optic components 32-40 and 64-70 facilitates testing nine sections of a detector portion of the camera 44, which has a relatively wide-angle field of view. For example, the camera 44 may have a field of view that spans 150°. The positions and orientations of the optic components 64-70 facilitate testing the sections of the detector portion of the camera 44 that would detect a target in the central and outer portions of the camera field of view.

The frame 60 supports the optic components of the illustrated example embodiment in multiple planes and at various angles. The optic components are supported by the example frame 60 in at least three different orientations. In an example embodiment, the frame 60 is a three-dimensional printed part, which allows for achieving the configuration of the desired arrangement of the optic components in a cost-effective manner.

One feature of the embodiment shown in FIGS. 3-5 is a relatively compact testing device 30 that fits within a reasonably sized packaging envelope (e.g., less than 200 cubic inches). This allows for positioning multiple camera testing devices 30 on the camera support 26 of the example system 20 shown in FIG. 1. The illustrated example embodiment facilitates greater camera testing efficiencies by allowing for multiple cameras to be tested simultaneously within a single environmental chamber 22.

The frame 60 and the arms 62 are made of a polymer material that is capable of withstanding the environmental conditions established within an environmental chamber used for testing cameras that are useful on automotive vehicles. The frame 60 and arms 62 are configured to be releasably connected with a camera 44 such that the frame 60 and the supported optic components are reusable for testing multiple cameras over time.

Figure 6:
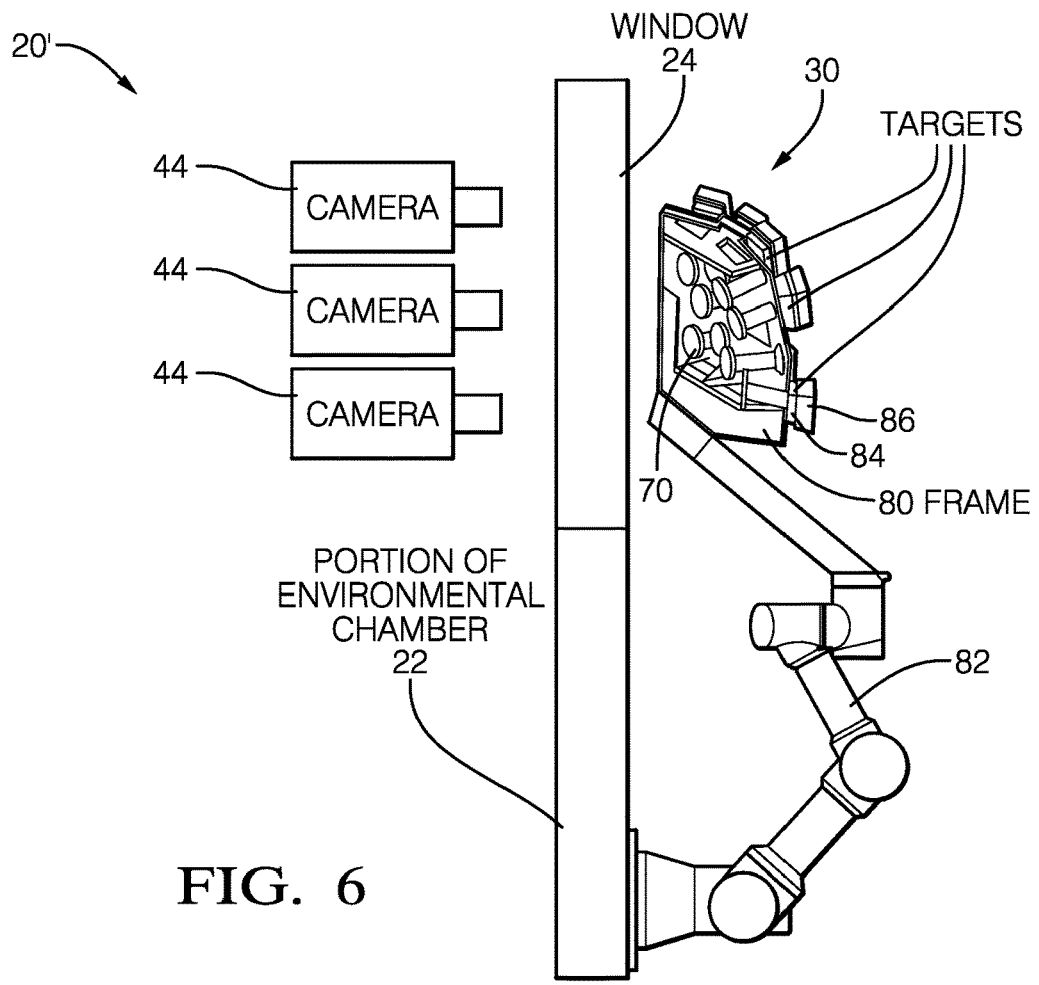
FIG. 6 schematically illustrates selected portions of another camera testing system embodiment.
Figure 7:
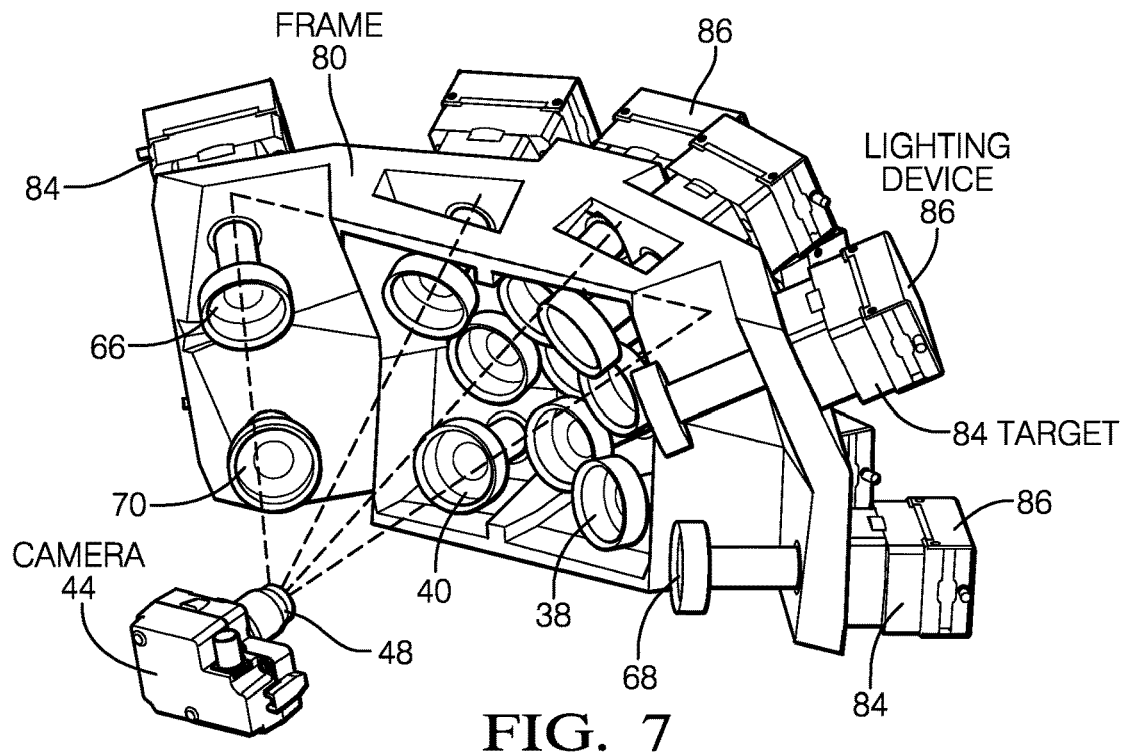
FIG. 7 is a diagrammatic, perspective illustration of the camera testing device of the embodiment shown in FIG. 6.

FIGS. 6 and 7 show selected portions of another camera testing system 20'. In this embodiment, optic components are supported by a frame 80 that is situated outside of the environmental chamber 22. An actuator 82, such as a robot arm, supports the frame 80 and is configured to move the frame 80 into a plurality of positions relative to the window 24 of the environmental chamber 22. The actuator 82 facilitates moving the frame 80 and the supported optic components into various positions to test multiple cameras 44 supported within the environmental chamber 22.

As best appreciated from FIG. 7, the frame 80 in this example supports thirteen optic components and a plurality of targets 84. Each of the optic components has an associated target 84. A lighting device 86 associated with each of the targets 84 is selectively controllable to emit a selected color or brightness of light for adjusting an appearance of the corresponding target. The individually controllable lighting devices 86 allow for adjusting the appearance of any of the targets 84 as may be needed for a particular testing procedure. For example, a particular camera being tested may only require nine targets and four of the lighting devices 86 may be controlled so that the corresponding targets do not appear and will not be detected by the camera 44. Alternatively, different lighting effects may be used to accommodate for the manner in which the window 24 reduces light transmission depending on the angle of view to the target 84 and its associated optic component relative to a camera 44 that is being tested.

The actuator 82 may move the frame 80 and the associated optic components and targets 84 into a variety of positions for testing the entire field of view of a single camera or multiple cameras over time. In some embodiments at least one image is acquired from the camera in each of the positions.

Figure 8:
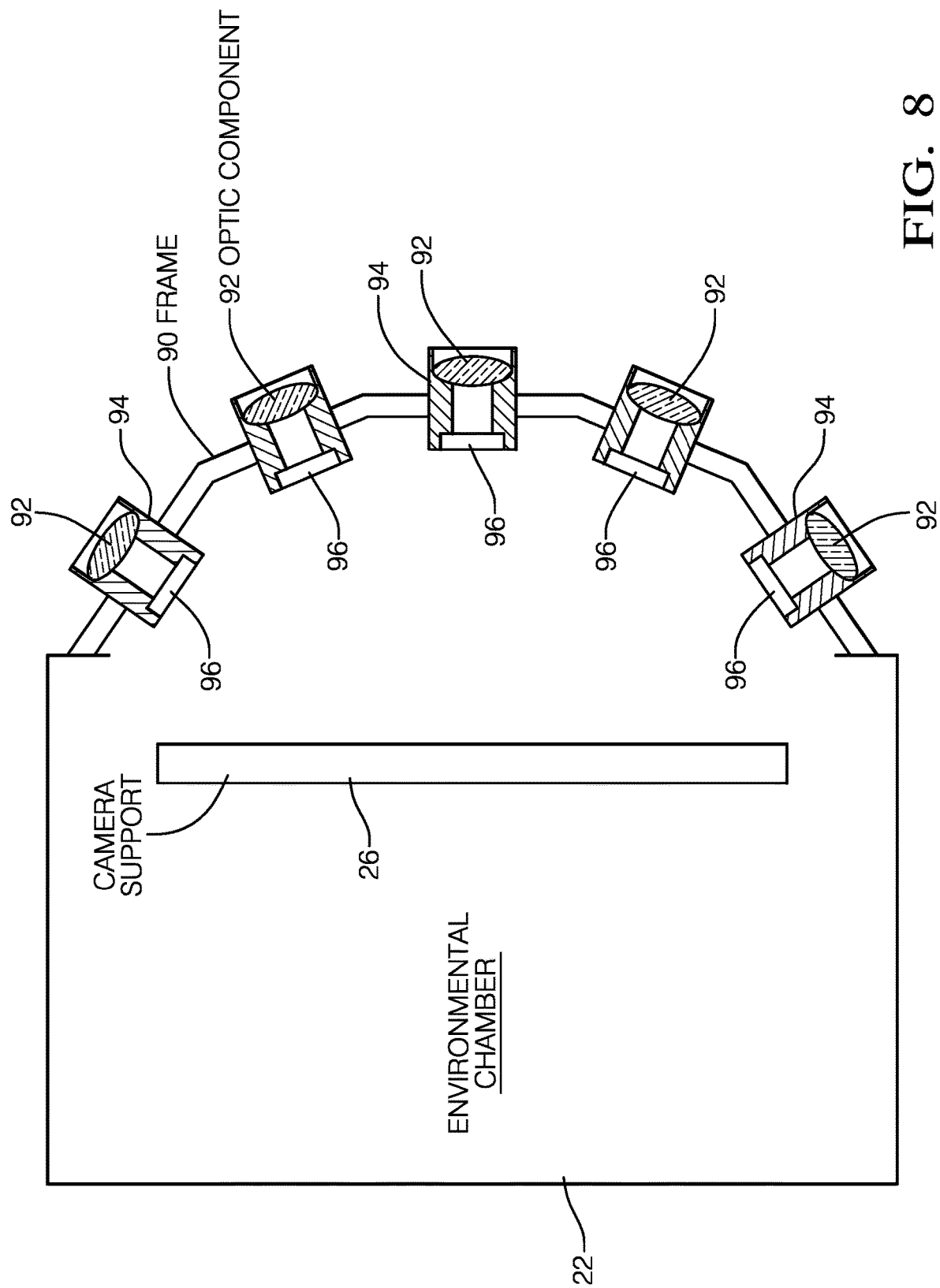
FIG. 8 schematically illustrates selected portions of another camera testing device embodiment.

FIG. 8 schematically illustrates another example embodiment in which a frame 90 is part of the environmental chamber 22. In this example, the frame 90 is a door or closure panel of the environmental chamber 22. A plurality of optic components 92 are supported by the frame 90. Each of the optic components 92 is housed in a vacuum sealed, insulated housing 94 that has a window 96 on a side that faces the interior of the environmental chamber 22. The vacuum sealed, insulated housing 94 avoid condensation on the optic components 92 that may otherwise be caused by differences in the environmental condition within the chamber 22 and the conditions outside of the chamber 22. The insulated effect of the vacuum sealed housings 94 reduces or eliminates any need to control air flow immediately outside of the environmental chamber 22 to avoid condensation of the optic components 92. Individual windows 96 of each housing 94 are configured to withstand exposure to the conditions in the environmental chamber 22.

With an embodiment like that shown in FIG. 8, no large window is required for the environmental chamber 22 provided that the optic components 92 are strategically placed for testing whatever camera configurations are of interest. The camera support 26 in the illustrated example embodiment includes an actuator (not illustrated) for moving one or more cameras within the environmental chamber 22 to achieve a desired alignment between the optic components 92 and the camera.

The various features of the disclosed embodiments are not necessarily limited to the arrangements that are shown. Other combinations of the disclosed features are possible to realize additional or different embodiments.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A camera testing system, comprising:
an environmental testing chamber configured to establish at least one preselected environmental testing condition, the environmental chamber including a door or closure panel;
a camera support situated within the environmental chamber;
at least one camera including a housing supporting a detector and a lens positioned in front of the detector portion, the housing being supported on the camera support and within the environmental chamber to expose the camera to the environmental testing condition; and
a plurality of testing optic components that are distinct from the camera, outside of the camera housing, and positioned relative to the camera support in a predetermined arrangement that places a center of each of the testing optic components in a position to be aligned with a line of sight of a respective, one of a plurality of predetermined portions of the detector of the camera,
wherein:
the door or closure panel is a frame supporting the plurality of testing optic components;

each of the testing optic components comprises a sealed housing including a lens, a window and a vacuum between the window and the lens; and the window of each optic component faces toward one side of the frame facing an interior of the environmental chamber.

2. The camera testing system of claim 1, wherein the frame supports at least a first one of the testing optic components in a first orientation, at least a second one of the testing optic components in a second orientation that is different than the first orientation, and at least a third one of the testing optic components in a third orientation that is different than the second orientation.

3. The camera testing system of claim 1, comprising a plurality of targets and wherein the frame also supports the targets in a target arrangement corresponding to the predetermined arrangement of the testing optic components.

4. The camera testing system of claim 3, wherein the targets include a source of light that is selectively controllable to emit a selected color or brightness of light for adjusting an appearance of at least a selected one of the targets.

5. The camera testing system of claim 1, wherein each of the testing optic components comprises an achromatic doublet lens.

6. The camera testing system of claim 1, wherein each of the testing optic components alters an appearance of a target in a manner that causes the target to appear farther from the optic component than an actual distance between the target and the optic component.

7. A method of testing a camera, the method comprising:

placing a housing of a camera in a desired position on a camera support within an environmental testing chamber configured to expose the camera to at least one preselected environmental testing condition, the housing of the camera supporting a detector and a lens in front of the detector;

arranging a plurality of testing optic components on a door or closure panel of the environmental testing chamber and relative to the camera support in an arrangement that places a center of each of the testing optic components in a position aligned with a line of sight of a respective, one of a predetermined plurality of portions of the detector of the camera, wherein the testing optic components are distinct from the camera and outside of the camera housing, wherein each of the testing optic components comprises a sealed housing including a lens, a window and a vacuum between the window and the lens, and wherein the window of each optic component faces toward one side of the door or closure panel facing an interior of the environmental chamber; and acquiring at least one image of at least one target from the camera while the plurality of testing optic components are in the arrangement.

8. The method of claim 7, wherein the door or closure panel supports the plurality of testing optic components in the arrangement with at least a first one of the testing optic components in a first orientation, at least a second one of the testing optic components in a second orientation that is different than the first orientation, and at least a third one of the testing optic components in a third orientation that is different than the second orientation.

9. The method of claim 7, comprising using the testing optic components to alter an appearance of a target in a manner that causes the target to appear farther from the optic component than an actual distance between the target and the optic component.

* * * * *